Figure 1:
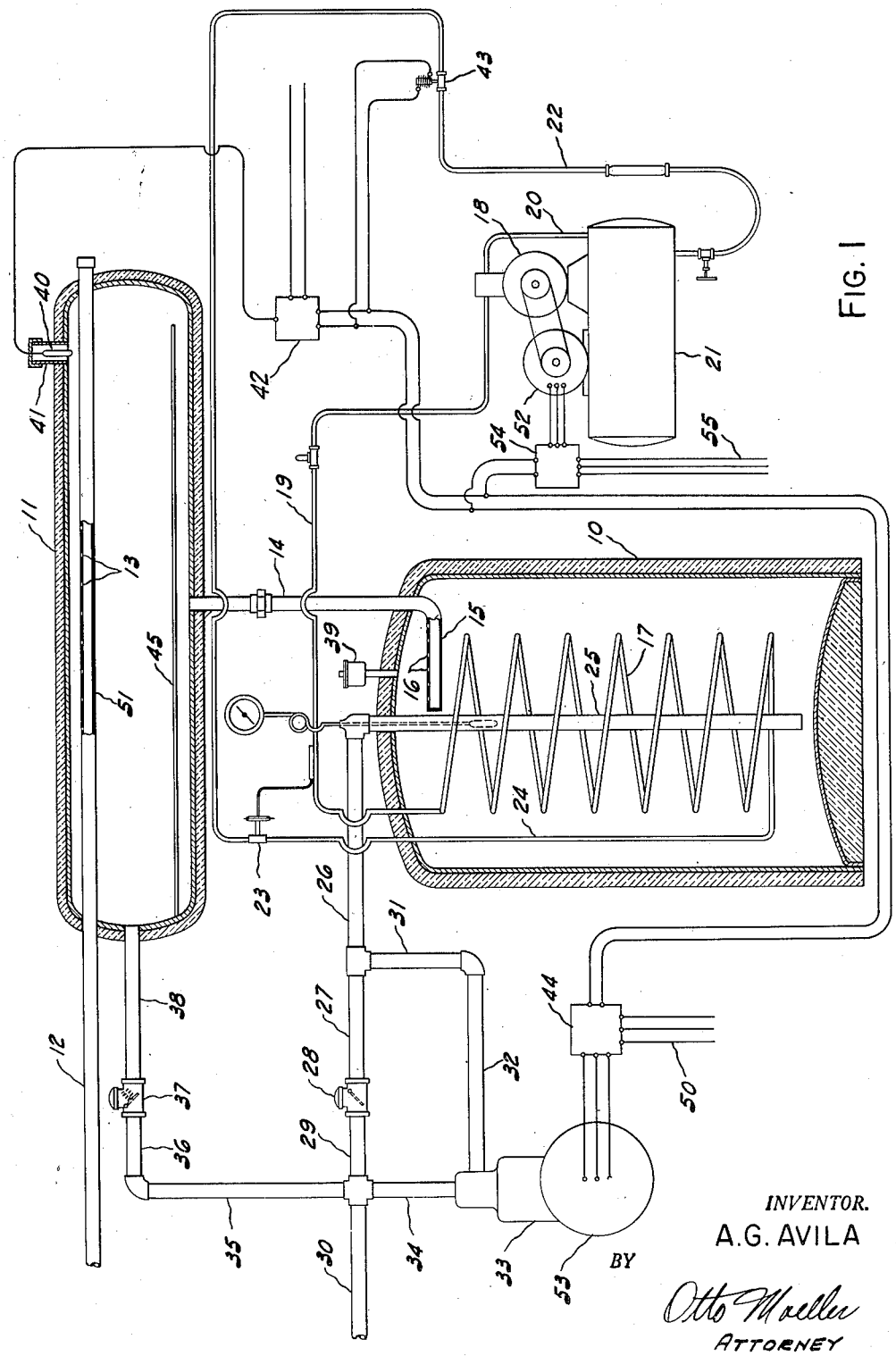

March 11, 1952     A. G. AVILA     2,589,186
LIQUID CONDITIONING SYSTEM

Filed Jan. 20, 1948     3 Sheets-Sheet 1

INVENTOR.
A.G. AVILA
BY
Otto Moeller
ATTORNEY

March 11, 1952  A. G. AVILA  2,589,186
LIQUID CONDITIONING SYSTEM
Filed Jan. 20, 1948  3 Sheets-Sheet 2

INVENTOR.
A.G. AVILA
BY
Otto Moeller
ATTORNEY

March 11, 1952 — A. G. AVILA — 2,589,186
LIQUID CONDITIONING SYSTEM
Filed Jan. 20, 1948 — 3 Sheets-Sheet 3

INVENTOR.
A. G. AVILA
BY Otto Moeller
ATTORNEY

Patented Mar. 11, 1952

2,589,186

UNITED STATES PATENT OFFICE 2,589,186

LIQUID CONDITIONING SYSTEM

Abelardo G. Avila, York, Pa., assignor to Read Standard Corporation, a corporation of Delaware Application January 20, 1948, Serial No. 3,245

14 Claims. (Cl. 257—2)

1

This invention relates to liquid conditioning systems, and more particularly to systems of the kind wherein liquid from a source of supply is conditioned and maintained in its conditioned state as a reservoir to be drawn upon intermittently.

While the invention is capable of broad application, it is particularly adapted to provide a supply of liquid at a closely controlled chilled temperature while being intermittently drawn upon, for example, in supplying water at a closely controlled chilled temperature to a mixer for incorporation with various ingredients to form a batch of dough. In the preparation of dough it is important that the ingredient water supplied to the mixer be at a predetermined closely controlled chilled temperature and be available at all times as required.

An object of the invention is to provide a simple and efficient system wherein liquid, as water from a city main or other source of supply is cooled and maintained in a cooled condition as a reservoir for intermittent withdrawal of quantities of liquid at a predetermined closely controlled temperature.

Another object is to provide such apparatus which is fully automatic, automatically receiving the warmer water from a source of supply to displace the withdrawn cooled water, automatically controlling the cooling of the water to a desired temperature and automatically maintaining it at the desired temperature within very close limits.

A further object is to provide a liquid conditioning system wherein liquid to be treated is circulated in heat exchange relation with a refrigerant liquid conditioning medium, and wherein operation of the liquid circulating system is automatically rendered inoperative while conditioned liquid is being withdrawn for use.

Another object is to provide an automatic system of the type just described in which, during withdrawal of conditioned liquid for use, the pump of the liquid circulating system is operative to amplify the flow of conditioned liquid to the point of use while being ineffective to recirculate the conditioned liquid through the system.

Another object is to provide a modified automatic system of the type described in which, during withdrawal of conditioned liquid for use, the pump is rendered inoperative for all purposes.

Another object is to provide a modified automatic system of the type described in which, during withdrawal of conditioned liquid for use, both the pump and the refrigerant circulating

2 system are rendered inoperative for all purposes.

A still further object is to provide a liquid conditioning system wherein unconditioned liquid is supplied to the system as conditioned liquid is withdrawn for use as needed, the system including a liquid circulating system and a refrigerant liquid conditioning medium circulating system in heat exchange relation, and thermostatically controlled means automatically controlling the operation of the liquid and medium circulating systems to bring the liquid to and maintaining it at a desired temperature.

Figure 2:
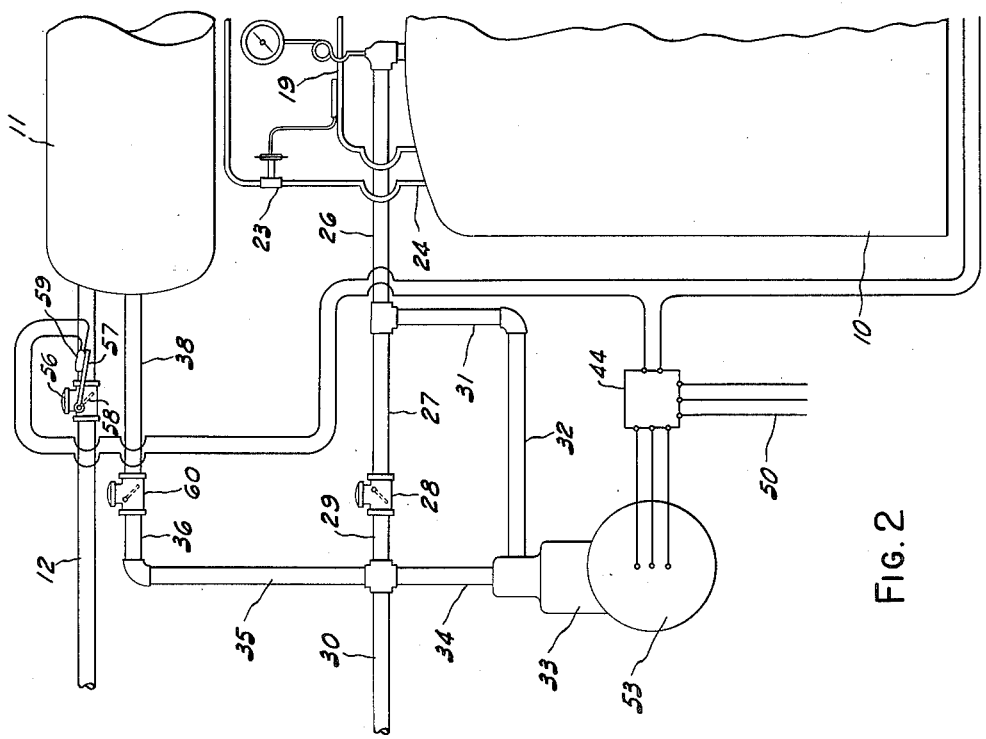
Figure 3:
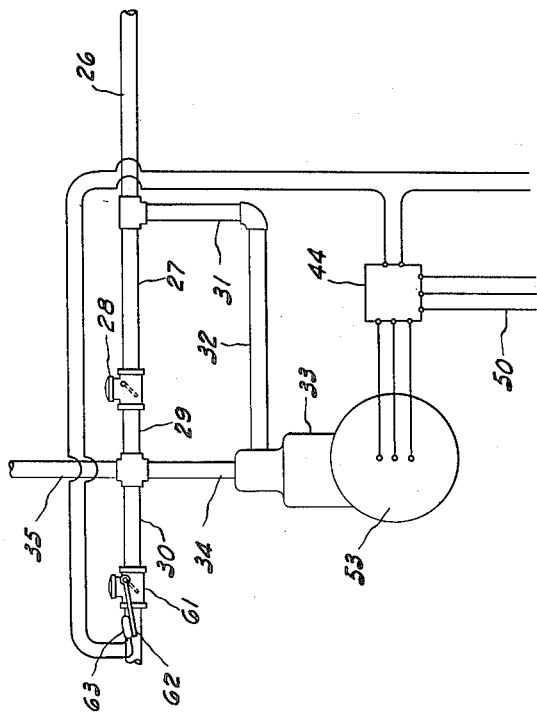
Figure 4:
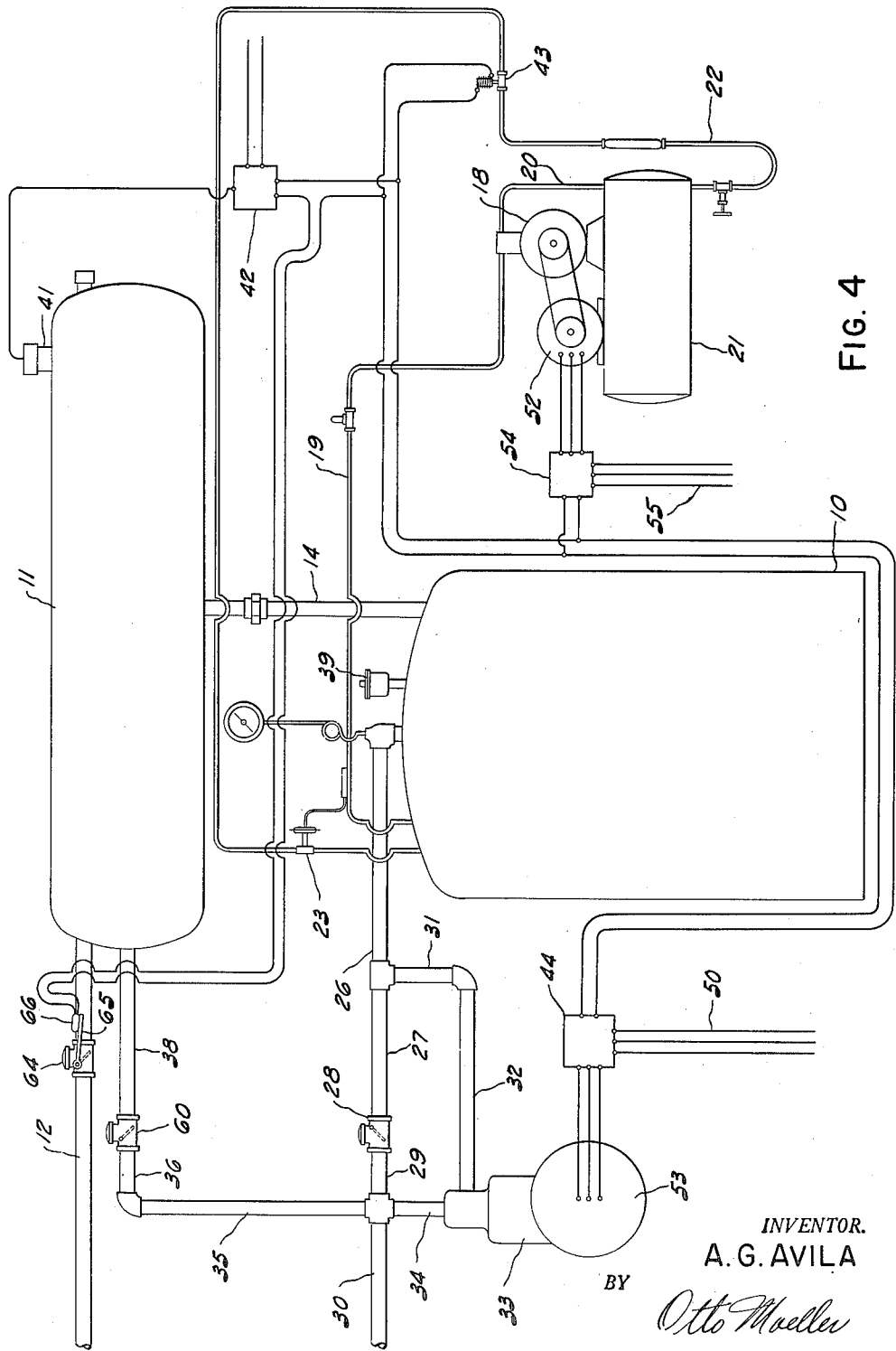

Other objects and features of the invention will appear from the following detailed description when read in connection with the accompanying drawings, in which Figure 1 is a diagrammatic view of the novel water cooling system, with the water containing tanks shown in cross section;

Figure 2 is a fragmentary diagrammatic view of a water cooling system similar in all respects with that shown in Figure 1, but showing means including a valve in the feed water line controlling an electric circuit for interrupting operation of the pump of the water circulating system during withdrawal of conditioned water;

Figure 3 is a fragmentary diagrammatic view of a modified form of the invention shown in Figure 2, wherein the control valve for interrupting operation of the pump during withdrawal of conditioned water is located in the conditioned water discharge line; and Figure 4 is a diagrammatic view of a modified form of the invention shown in Figure 2, wherein the valve in the feed water line controls an electric circuit for interrupting operation of the pump of the water circulating system and operation of the refrigerant circuit during withdrawal of conditioned water.

In the drawings, referring particularly to Figure 1, the numeral 10 designates a vertically erect main water tank and the numeral 11 designates a longitudinally elongated auxiliary water tank. The auxiliary water tank 11 preferably has a capacity about one-third that of the main water tank 10.

A water supply line 12, which preferably connects with the city mains, extends into and through the upper portion of auxiliary water tank 11. That portion of the supply line 12 within the tank 11 forms a header 51 which is provided along its upper side and along its full length with a plurality of spaced orifices 13 through which the water from the main enters the tank 11.

A pipe 14 communicating with the bottom of the tank 11 and extending into the upper portion of the tank 10 permits water to flow by gravity or hydraulic pressure from the tank 11 to the tank 10. The portion of pipe 14 extending into the tank 10 is provided with a horizontal section or header 15 provided along its upper side with spaced orifices 16 through which water passes from the pipe 14 to the tank 10.

The tank 10 is provided with a heat exchange or cooling coil 17 for cooling the water in the tank. The coil 17 is preferably disposed centrally of the tank 10 extending vertically from a position near the bottom to a position near the top of the tank 10. Any suitable refrigeration system, may be employed for cooling the coil 17. The system illustrated in the drawings include, in addition to the coil 17, a compressor 18 operated by a motor 52 which takes the refrigerant, preferably Freon, from the upper end of the coil 17 through the pipe 19 and passes it on in compressed condition through the pipe 20 to the condenser-receiver 21 where it is condensed and stored in liquid form.

From the condenser-receiver 21, the refrigerant flows through pipe 22 to the expansion valve 23 where the flow of the refrigerant is throttled down and passes through the pipe 24 to the lower end of the coil 17. When the refrigerant enters the pipe 24 it starts to boil and as a boiling liquid it flows to the expansion coil 17. Here the boiling becomes vigorous, due to the heat imparted to the refrigerant from the water in the tank 10, which is giving up its heat through the coil 17. As long as the compressor 18 is in operation, the refrigerant circulates repeatedly through the circuit described above, continuously abstracting heat from the water in tank 10, thereby reducing the temperature of the water. Operation of the compressor 18 is automatically stopped and started upon the occurrence of certain predetermined conditions, as will presently appear.

Water is withdrawn from the tank 10 through a pipe 25 which projects through the top of the tank 10 and extends downwardly inside the coil 17, terminating at its lower end near the bottom of the tank 10. The cooled water withdrawn through pipe 25 may then pass through pipe 26, pipe 27, check valve 28, pipe 29, then through pipe 30 to a point of use, as for example, as ingredient water to a dough mixer (not shown). Or the cooled water withdrawn through pipe 25 may pass through pipe 26, pipe 31, pipe 32, pump 33, pipe 34, pipe 35, pipe 36, the spring loaded check valve 37, pipe 38 and then into the tank 11, forming with the pipe 14 a circulatory system for water between the tanks 10 and 11. The pump 33 and motor 53 therefor, may be of any suitable type, the motor being adapted to be supplied with current from a suitable source of power supply through supply lines 50.

In operation, the system is originally filled with water from the city main through the pipe 12, and air in the system is expelled through the air relief valve 39 communicating with the upper end of the tank 10. The water entering the system from the city main or other source is at a temperature above that desired as ingredient water to be used in the preparation of dough in a mixer.

A thermostatic control bulb 40 disposed in a well 41 communicating with the top of the tank 11 is arranged, through well known control mechanism, to actuate the refrigerant circuit when the water temperature rises above a pre- selected temperature and to interrupt operation of the refrigerant circuit when the water temperature drops below a pre-selected temperature. The control mechanism includes the thermostatic controlled switch 42 arranged to control a switch 54 for permitting current to flow or interrupting flow of current from a source of power 55 to the motor 52. Where, for example, the water is to be used as ingredient water in the preparation of dough, the thermostatic control is arranged to control the refrigerant circuit to maintain a water temperature of 34 to 35° F.

The thermostatic switch device 42 simultaneously causes the solenoid operated valve 43 to close upon cessation of operation of the compressor 18 and to open upon operation of the compressor 18. Thus when the compressor 18 stops, the simultaneous closing of the valve 43 prevents refrigerant from the pressurized condenser-receiver 21 from flowing through the system past the valve 43, and of course, when the compressor starts to function, the simultaneous opening of the valve 43 permits circulation of refrigerant through the system.

The thermostatic switch device 42 also controls a switch 44 for operating the pump 33 whereby the pump 33 starts to function simultaneously with the compressor 18 and stops simultaneously with the compressor 18.

Thus with the tanks 10 and 11 being filled with water from the pipe 12, and the temperature of the water being above 35° F. the thermostatic control system effects operation of the refrigerant circuit. At the same time the pump 33 starts operating providing a circulation of water between the tanks 10 and 11 through the circulating system previously described. As the water circulates, heat is abstracted from it, and the continuous recirculation thereof gradually reduces the temperature to the pre-selected temperature for which the control system is set, which in the present example is 34-35° F., whereupon the thermostatic control bulb actuates the previously described controls to shut off the pump 33, the compressor 18, and to close the valve 43.

Now when refrigerated water is withdrawn from the tank 10 as ingredient water into a mixer beyond pipe 30, water automatically enters the tank 11 through the orifices 13 in header 51 displacing the water that has been withdrawn. By reason of the header being near the top of the tank 11, and being provided with orifices 13 along its upper side, the warm water tends to stratify preventing rise in temperature of the refrigerated water being withdrawn. A baffle 45 in the tank 11 and the location of header 15 in the tank 10 together with the orifices along the upper side of the header 15, also tend to prevent mixing of the warm water with the refrigerated water being withdrawn, thereby assuring the closely controlled temperature of the water withdrawn.

When ingredient water is drawn into the mixer from pipe 30, the spring loaded check valve 37 prevents water from being withdrawn from the tank 11 and assures withdrawal of refrigerated water from the tank 10 through pipe 25, pipe 26, pipe 27, check valve 28, pipe 29 and pipe 30.

As the refrigerated water is withdrawn, warmer water from the main enters the tank 11, impinges on the walls of the control bulb 40, raising the temperature and as previously explained effects functioning of the pump 33 and opens refrigerant feed to the coil 17. The pump 33 will pump refrigerated water from tank 10 through pipes 25, 26, 31, 32, 34, and 30 to the point of use, as to the mixer in the present example. The check valve 28 prevents recirculation of the water through pipes 29 and 27 and back through the pump 33, and the spring load on check valve 37 prevents recirculation through pipes 35, 36 and 38 back to the tank 11. Now, when refrigerated water is no longer being withdrawn into the mixer, the only circuit for the water discharged from the pump 33 is through pipes 34, 35, 36, check valve 37 by overcoming the spring resistance, pipe 38 and into tank 11, thereby providing a continuous circulation of water through the tanks 10 and 11, until the water contacting the control bulb 40 again reaches the pre-selected temperature of 34–35° F., when the entire system shuts down, as previously described.

The system described above allows drawing at least one third the capacity of the main tank 10 at constant temperature and at least one half the capacity thereof without exceeding 1° F. rise in liquid temperature in each continuous drawing. At higher temperatures than that used in the preferred example, greater percentages of liquid can be withdrawn at constant temperature.

In Figure 2 is shown a water conditioning system in all respects the same as that shown in Figure 1 with the exception that means is provided for automatically interrupting operation of the pump 33 while conditioned water is being withdrawn through pipe 30. This means includes a swing check valve 56 interposed in the feed water line 12. An arm 57 outside the valve 56 is connected in any suitable manner to swing with the disc 58 of the valve 56. The arm 57 carries a mercury switch 59 which in one position of the valve 56 makes and in the other position of the valve 56 breaks a circuit that is connected in series with one lead to the pump starting switch 44.

In operation, assuming that water is being withdrawn from the tank 10 through pipe 30, then water will flow through feed pipe 12 into tank 11 to replace the water being withdrawn. The water flowing through pipe 12 opens the swing check valve 56, raising the arm 57 causing the mercury in tube 59 to break the circuit to the pump starting switch 44, whereupon operation of the pump 33 is interrupted.

When water is no longer being withdrawn and the tanks 10 and 11 are filled, the swing check valve 56 reassumes its original position, as shown in Figure 2, whereupon the arm 57 swings downward causing the mercury in tube 59 to close the circuit to the pump starting switch 44, effecting operation of the pump 33.

Since during withdrawal of water, the pump 33 is rendered inoperative, the swing check valve 60 need not be spring loaded, as is the valve 37 of Figure 1. However, it may be spring loaded if desired, but the load must of course be such as to yield to the pressure of the pump 33 during recirculation of water in the system.

The modification of the invention shown in Figure 3 is in all respects the same as that illustrated in Figure 2, except that the swing check valve 61 which is the same as swing check valve 56 of Figure 2, is disposed in the discharge line 30 instead of in the feed water line to the auxiliary tank. In operation, while water is being withdrawn through line 30, the arm 62 of valve 61 swings upwardly causing the mercury switch 63 to break the circuit to the pump starting switch 44, and thereby interrupts operation of the pump 33.

The modification of the invention illustrated in Figure 4 is the same as that shown in Figure 2 except that the circuit controlled by the swing check valve 64, which is in all respects the same as valve 56 of Figure 2, is connected in series with one lead to both the compressor starting switch 54 and the pump starting switch 44. Thus, while water is being withdrawn through the discharge pipe 30, replacement water entering tank 11 through the feed water line 12 causes the arm 65 of the valve 64 to swing upwardly, whereupon the mercury switch 66 breaks the circuit to the switch boxes 54 and 44, and interrupts operation of both the refrigerating circuit and the pump.

It is evident from the above description that the system is entirely automatic and dispenses with manual manipulation of valves except of course for the valve controlling the withdrawing of the desired quantity of water for ultimate use.

For exceptionally large demands of refrigerated water, a refrigerant coil placed inside the auxiliary tank 11 and supplied with refrigerant by means of a separate expansion valve, will furnish additional refrigeration to carry the added load.

While the invention has been described as a system for cooling water for a specific purpose and at specifically controlled temperatures, it is apparent that the invention is adapted for cooling of various liquids for a variety of practical uses and at any desired temperature.

I claim:

1. A liquid conditioning system comprising liquid containing means, a heat exchange element in said containing means adapted to bring a liquid to be treated and a liquid conditioning medium into heat exchange relation, means for introducing unconditioned liquid into the upper portion of said containing means, a liquid circulating system for withdrawal of conditioned liquid from the lower portion of said containing means and reintroduction thereof into the upper portion of said containing means, a medium circulating system for delivering heat exchange medium to said element, means responsive to the temperature of liquid in the upper portion of said containing means to control operation of said liquid and medium circulating systems, means for withdrawal of conditioned liquid for use as needed, and valve means responsive to such withdrawal of conditioned liquid for use to interrupt passage of conditioned liquid into the upper portion of said containing means while conditioned liquid is being withdrawn.

2. A liquid conditioning system comprising a main tank and an auxiliary tank, a heat exchange element in said main tank adapted to bring a liquid to be treated and a liquid conditioning medium into heat exchange relation, means for introducing unconditioned liquid into said auxiliary tank, a liquid circulating system connecting said main and auxilary tanks adapted for withdrawal of conditioned liquid from said main tank and reintroduction thereof into said auxiliary tank, a medium circulating system for delivering heat exchange medium to said element, means responsive to the temperature of liquid in said auxiliary tank to control operation of said liquid and medium circulating systems, means associated with said liquid circulating system for withdrawal of conditioned liquid for use as needed, and valve means responsive to withdrawal of conditioned liquid to interrupt passage of conditioned liquid to said auxiliary tank while conditioned liquid is being withdrawn.

3. A liquid conditioning system comprising a main tank and an auxiliary tank, a heat exchange element in said main tank adapted to bring a liquid to be treated and a liquid conditioning medium into heat exchange relation, means for introducing unconditioned liquid into said auxiliary tank, a liquid circulating system connecting said main and auxiliary tanks adapted for withdrawal of conditioned liquid from said main tank and reintroduction thereof into said auxiliary tank, a medium circulating system for delivering heat exchange medium to said element, thermostatically controlled means responsive to the temperature of liquid in said auxiliary tank arranged for simultaneously controlling operation of said liquid and medium circulating systems, means for withdrawal of conditioned liquid for use as needed, and valve means responsive to withdrawal of conditioned liquid to interrupt passage of conditioned liquid to said auxiliary tank while conditioned liquid is being withdrawn.

4. A liquid conditioning system comprising a main tank and an auxiliary tank, a heat exchange element in said main tank adapted to bring a liquid to be treated and a liquid conditioning medium into heat exchange relation, means for introducing unconditioned liquid into said auxiliary tank, a liquid circulating system including a force feed line adapted for withdrawal of conditioned liquid from said main tank and reintroduction thereof into said auxiliary tank and a gravity-pressure feed line for delivering liquid from said auxiliary tank to said main tank, a medium circulating system for delivering heat exchange medium to said element, means responsive to the temperature of liquid in said auxiliary tank to control operation of said liquid and medium circulating systems, means connected with said force feed line for withdrawal of conditioned liquid for use as needed, and valve means in said force feed line responsive to withdrawal of conditioned liquid to interrupt passage of conditioned liquid to said auxiliary tank while conditioned liquid is being withdrawn.

5. A liquid conditioning system comprising a main tank and an auxiliary tank, a heat exchange element in said main tank adapted to bring a liquid to be treated and a liquid conditioning medium into heat exchange relation, means for introducing unconditioned liquid into said auxiliary tank, a liquid circulating system connecting said main and auxiliary tanks adapted for withdrawal of conditioned liquid from said main tank and reintroduction thereof into said auxiliary tank, a medium circulating system for delivering heat exchange medium to said element, thermostatically controlled means responsive to liquid temperature in said auxiliary tank above a predetermined temperature for operating said liquid and medium circulating systems and below a predetermined temperature for interrupting operation of said liquid and medium circulating systems, means for withdrawal of conditioned liquid for use as needed, and valve means responsive to such withdrawal of conditioned liquid to interrupt passage of conditioned liquid to said auxiliary tank while conditioned liquid is being withdrawn.

6. A liquid conditioning system comprising liquid containing means, a heat exchange element in said containing means adapted to bring a liquid to be treated and a liquid conditioning medium into heat exchange relation, means for introducing unconditioned liquid into the upper portion of said containing means, a liquid circulating system including a pump for withdrawal of conditioned liquid from the lower portion of said containing means and reintroduction thereof into the upper portion of said containing means, a medium circulating system for delivering heat exchange medium to said element, means responsive to the temperature of liquid in the upper portion of said containing means to control operation of said liquid and medium circulating systems, and means responsive to withdrawal for use of conditioned liquid for interrupting operation of said pump during such withdrawal.

7. A liquid conditioning system comprising liquid containing means, a heat exchange element in said containing means adapted to bring a liquid to be treated and a liquid conditioning medium into heat exchange relation, means for introducing unconditioned liquid into the upper portion of said containing means, a liquid circulating system including a pump for withdrawal of conditioned liquid from the lower portion of said containing means and reintroduction thereof into the upper portion of said containing means, a medium circulating system for delivering heat exchange medium to said element, means responsive to the temperature of liquid in the upper portion of said containing means to control operation of said liquid and medium circulating systems, and means responsive to withdrawal for use of conditioned liquid for interrupting operation of said pump and said medium circulating system during such withdrawal.

8. A liquid conditioning system comprising liquid containing means, a heat exchange element in said containing means adapted to bring a liquid to be treated and a liquid conditioning medium into heat exchange relation, means for introducing unconditioned liquid into the upper portion of said containing means, a liquid circulating system including a pump for withdrawal of conditioned liquid from the lower portion of said containing means and reintroduction thereof into the upper portion of said containing means, a medium circulating system for delivering heat exchange medium to said element, means responsive to the temperature of liquid in the upper portion of said containing means to control operation of said liquid and medium circulating systems, and means responsive to withdrawal for use of conditioned liquid for interrupting operation of said pump during such withdrawal, said last named means including a normally closed valve adapted to open upon withdrawal of conditioned liquid for use, and means responsive to said valve in its closed position to close an electric circuit to the actuating means of said pump and responsive to said valve in its open position to break an electric circuit to the actuating means of said pump.

9. A liquid conditioning system comprising liquid containing means, a heat exchange element in said containing means adapted to bring a liquid to be treated and a liquid conditioning medium into heat exchange relation, means for introducing unconditioned liquid into the upper portion of said containing means, a liquid circulating system including a pump for withdrawal of conditioned liquid from the lower portion of said containing means and reintroduction thereof into the upper portion of said containing means, a medium circulating system for delivering heat exchange medium to said element, means responsive to the temperature of liquid in the upper portion of said containing means to control operation of said liquid and medium circulating systems, and means responsive to withdrawal for use of conditioned liquid for interrupting operation of said pump and said medium circulating system during such withdrawal, said last named means including a normally closed valve adapted to open upon withdrawal of conditioned liquid for use, and means responsive to said valve in its closed position to close an electric circuit to the actuating means of said pump and said medium circulating system and responsive to said valve in its open position to break an electric circuit to the actuating means of said pump and said medium circulating system.

10. A liquid conditioning system comprising a main tank and an auxiliary tank, a heat exchange element in said main tank adapted to bring a liquid to be treated and a liquid conditioning medium into heat exchange relation, means for introducing unconditioned liquid into said auxiliary tank, a liquid circulating system including a pump connecting said main and auxiliary tanks, a medium circulating system for delivering heat exchange medium to said element, means responsive to the temperature of liquid in said auxiliary tank to control operation of said liquid and medium circulating systems, and means responsive to withdrawal for use of conditioned liquid from said main tank for interrupting operation of said pump during such withdrawal.

11. A liquid conditioning system comprising a main tank and an auxiliary tank, a heat exchange element in said main tank adapted to bring a liquid to be treated and a liquid conditioning medium into heat exchange relation, means for introducing unconditioned liquid into said auxiliary tank, a liquid circulating system including a pump connecting said main and auxiliary tanks, a medium circulating system for delivering heat exchange medium to said element, means responsive to the temperature of liquid in said auxiliary tank to control operation of said liquid and medium circulating systems, and means responsive to withdrawal for use of conditioned liquid from said main tank for interrupting operation of said pump and said medium circulating system during such withdrawal.

12. A liquid conditioning system comprising liquid containing means, a heat exchange element in said containing means adapted to bring a liquid to be treated and a liquid conditioning medium into heat exchange relation, an intake line for introducing unconditioned liquid into the upper portion of said containing means, a liquid circulating system including a pump for withdrawal of conditioned liquid from the lower portion of said containing means and reintroduction thereof into the upper portion of said containing means, a medium circulating system for delivering heat exchange medium to said element, means responsive to the temperature of liquid in the upper portion of said containing means to control operation of said liquid and medium circulating systems, and means in said intake line responsive to flow of liquid therethrough into said containing means as conditioned water is withdrawn for use from said containing means for interrupting operation of said pump during such withdrawal.

13. A liquid conditioning system comprising liquid containing means, a heat exchange element in said containing means adapted to bring a liquid to be treated and a liquid conditioning medium into heat exchange relation, an intake line for introducing unconditioned liquid into the upper portion of said containing means, a liquid circulating system including a pump for withdrawal of conditioned liquid from the lower portion of said containing means and reintroduction thereof into the upper portion of said containing means, a medium circulating system for delivering heat exchange medium to said element, means responsive to the temperature of liquid in the upper portion of said containing means to control operation of said liquid and medium circulating systems, and means in said intake line responsive to flow of liquid therethrough into said containing means as conditioned water is withdrawn for use from said containing means for interrupting operation of said pump and said medium circulating system during such withdrawal.

14. A liquid conditioning system comprising liquid containing means, a heat exchange element in said containing means adapted to bring a liquid to be treated and a liquid conditioning medium into heat exchange relation, means for introducing unconditioned liquid into the upper portion of said containing means, a liquid circulating system including a pump for withdrawal of conditioned liquid from the lower portion of said containing means and reintroduction thereof into the upper portion of said containing means, a medium circulating system for delivering heat exchange medium to said element, means responsive to the temperature of liquid in the upper portion of said containing means to control operation of said liquid and medium circulating systems, a discharge line for withdrawing conditioned liquid for use, and means in said discharge line responsive to flow of liquid therethrough for interrupting operation of said pump during such withdrawal.

ABELARDO G. AVILA.

REFERENCES CITED

The following references are of record in the file of this patent:

UNITED STATES PATENTS

| Number | Name | Date |
|---|---|---|
| 1,698,561 | Ransom | Jan. 8, 1929 |
| 2,291,023 | Burklin | July 28, 1942 |
| 2,455,590 | Krauss | Dec. 7, 1948 |